US010289392B2

(12) United States Patent
Clapauch et al.

(10) Patent No.: US 10,289,392 B2
(45) Date of Patent: *May 14, 2019

(54) REDUCING CALL OVERHEAD THROUGH FUNCTION SPLITTING

(71) Applicant: International Business Machines Corporation, Armonk, NY (US)

(72) Inventors: Jaques Clapauch, Great Neck, NY (US); Steven J. Perron, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/835,878

(22) Filed: Dec. 8, 2017

(65) Prior Publication Data

US 2018/0101368 A1    Apr. 12, 2018

Related U.S. Application Data

(63) Continuation of application No. 15/140,665, filed on Apr. 28, 2016, now Pat. No. 9,940,110, which is a continuation of application No. 14/883,824, filed on Oct. 15, 2015, now Pat. No. 9,916,142.

(51) Int. Cl.
*G06F 8/41* (2018.01)

(52) U.S. Cl.
CPC .............. *G06F 8/443* (2013.01); *G06F 8/433* (2013.01); *G06F 8/4441* (2013.01)

(58) Field of Classification Search
None
See application file for complete search history.

(56) References Cited

U.S. PATENT DOCUMENTS

| | | | | |
|---|---|---|---|---|
| 5,878,261 A * | 3/1999 | Holler | .................. | G06F 9/4484 717/157 |
| 6,367,071 B1 * | 4/2002 | Cao | ........................ | G06F 8/443 712/E9.058 |

(Continued)

OTHER PUBLICATIONS

Chow, "Minimizing Register Usage Penalty at Procedure Calls", 1988, I988 ACM O-8979 I-269-I/88/0006/0085 (Year: 1988).*

(Continued)

*Primary Examiner* — Hossain M Morshed
(74) *Attorney, Agent, or Firm* — Erik K. Johnson

(57) ABSTRACT

Embodiments disclose a method, computer program product, and system for optimizing computer functions. The embodiment may create a control flow graph from a computer function. The control flow graph may contain an entry block, an exit block, and basic blocks located between the entry block and the exit block. The embodiment may classify each of the basic blocks as an original heavy basic block or an original light basic block. The embodiment may classify the original heavy block, the exit block and each of the basic blocks that are located between each original heavy block and the exit block as a determined heavy block. The embodiment may create light computer functions and heavy computer functions from the computer function. Each heavy computer function contains the basic blocks classified as determined heavy. The light computer functions contains the remaining basic blocks, the exit block and calls to the heavy computer functions.

17 Claims, 6 Drawing Sheets

(56) References Cited

U.S. PATENT DOCUMENTS

| | | | |
|---|---|---|---|
| 7,007,272 B2* | 2/2006 | Clarke | G06F 8/445 717/144 |
| 8,312,439 B2* | 11/2012 | Kielstra | G06F 9/45516 717/148 |
| 8,561,045 B2 | 10/2013 | Porras et al. | |
| 8,701,097 B2* | 4/2014 | Doyle | G06F 8/4443 717/106 |
| 8,762,974 B1 | 6/2014 | Smith et al. | |
| 2003/0088860 A1* | 5/2003 | Wang | G06F 8/443 717/153 |
| 2007/0089106 A1* | 4/2007 | Lobo | G06F 8/445 717/162 |
| 2008/0028380 A1* | 1/2008 | Guo | G06F 8/433 717/151 |
| 2011/0179403 A1* | 7/2011 | Lerouge | G06F 8/4443 717/141 |
| 2012/0017203 A1* | 1/2012 | O'Brien | G06F 8/441 717/140 |
| 2014/0007062 A1* | 1/2014 | Schmidt | G06F 8/4441 717/156 |
| 2014/0289726 A1* | 9/2014 | Rugina | G06F 9/45525 718/1 |
| 2017/0109147 A1 | 4/2017 | Clapauch et al. | |
| 2017/0109149 A1 | 4/2017 | Clapauch et al. | |

OTHER PUBLICATIONS

Lee, "Aggressive Function Splitting for Partial Inlining", 2011, Proceedings of the 15th Workshop on Interaction between Compilers and Computer Architectures. IEEE Interact. San Antonio, TX, USA: IEEE Computer Society Press, Feb. 2011, pp. 80-86. ISBN: 978-1-4577-0834-3. (Year: 2011).*

IBM, List of IBM Patents or Patent Applications Treated as Related, Appendix P, dated Dec. 21, 2017, 2 pages.

Lee et al., "Aggressive Function Splitting for Partial Inlining," Interaction between Compilers and Computer Architectures (INTERACT), 2011 15th Workshop, Feb. 12-12, 2011, San Antonio, TX, 8 pages.

IBM, "C/C++ and Fortran compilers for new Linux distributions on IBM Power Systems built with POWER8 technology," Dec. 12, 2014, pp. 1-3. Grace Period Disclosure.

Chow, "Minimizing Register Usage Penalty at Procedure Calls", Proceeding of the SIGPLAN '88 Conference on Programming Language Design and Implementation, Jun. 22-24, 1988, pp. 85-94.

* cited by examiner

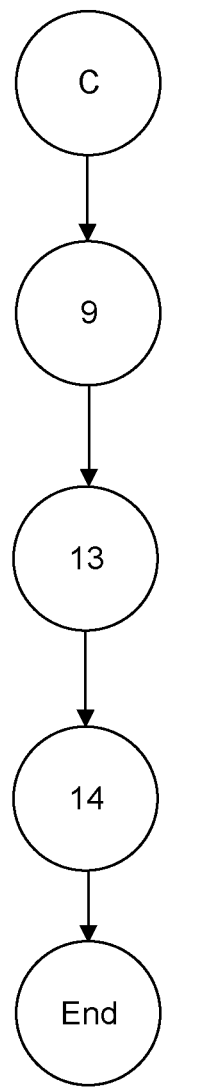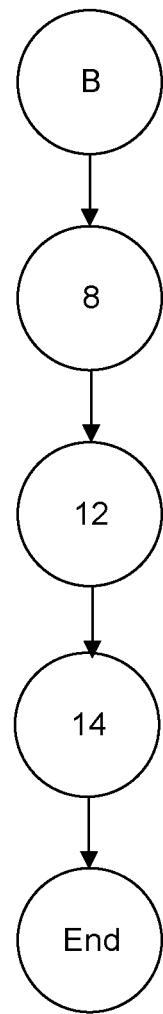
FIG. 4c
FIG. 4d

REDUCING CALL OVERHEAD THROUGH FUNCTION SPLITTING

STATEMENT REGARDING PRIOR DISCLOSURES BY THE INVENTOR OR A JOINT INVENTOR

Aspects of the present invention have been disclosed by the Applicant, who obtained the subject matter disclosed directly from the inventors, in the product IBM XL compilers for AIX/LINUX, made available to the public on Dec. 1, 2014.

BACKGROUND

The present invention relates to computer compilers, and more particularly to splitting computer functions for more efficient operation.

Early in the history of programming, people realized that they needed to define a standard way of calling functions. This was done so that it would be possible to call a function for which you do not have definition. For example, it could be calling a function defined in a different object file or in a shared library. This convention is called the application binary interface (ABI). The ABI is needed, but it causes there to be a number of instructions to be executed every time a function is called that does not relate to the main task of the program being run. These instructions are the call overhead. In many modern programs, the call overhead is a significant portion of the run time.

A compiler is a computer program (or set of programs) that transforms source code written in a programming language (the source language) into another computer language (the target language, often having a binary form known as object code). The most common reason for converting source code is to create an executable program. The name "compiler" is primarily used for programs that translate source code from a high-level programming language to a lower level language (e.g., assembly language or machine code).

Compliers often begin to analyze a program by building a Control Flow Graph (CFG). A CFG is a visual technique that uses a directed graph possessing nodes, such as basic blocks and regions, where a basic block would be a collection of instructions and a region a collection of basic blocks. Basic Blocks are a portion of the code within a program with only one entry point and only one exit point. This makes a basic block highly amenable to analysis. Compilers usually decompose programs into their basic blocks as a first step in the analysis process. Typically, basic blocks form the vertices or nodes in a control flow graph.

In control flow graphs, a node "d" dominates a node "n" if every path from the entry node to n must go through d. A node d strictly dominates a node n if d dominates n and d does not equal n. The immediate dominator of a node n is the unique node that strictly dominates n but does not strictly dominate any other node that strictly dominates n. A dominator tree is a tree where each node's children are those nodes it immediately dominates. Because the immediate dominator is unique, it is a tree. The entry node is the root of the tree.

In control flow graphs, a region is said to be strongly connected if every vertex is reachable from every other vertex.

BRIEF SUMMARY

Embodiments of the present invention disclose a method, computer program product, and system for optimizing a computer function. The embodiment of the present invention may create a control flow graph from a computer function. The control flow graph may contain an entry block, an exit block, and one or more basic block located between the entry block and the exit block. The computer function may include one or more commands. Further, the entry block, the exit block, and one or more basic blocks each represent a command of the one or more commands. The embodiment of the present invention may classify each of the one or more basic blocks as an original heavy basic block or an original light basic block. A block designated as an original heavy basic block comprises a command that requires one or more of non-volatile register space, and saving and restoring a register. A block designated as an original light basic block comprises a command that does not require non-volatile register space, and saving and restoring a register. The embodiment of the present invention may classify the original heavy block, the exit block and each of the basic blocks that are located between each original heavy block and the exit block as a determined heavy block. The embodiment of the present invention may create one or more light computer function and one or more heavy computer function from the computer function. Each heavy computer function contains the basic blocks classified as determined heavy. The light computer function contains all basic blocks not present in the heavy computer function, the exit block and one or more calls to the one or more heavy computer functions.

BRIEF DESCRIPTION OF THE DRAWINGS

FIG. 4a is an illustrative example of a control flow graph of the light function of FIG. 1 following the operation of the function splitting compiler of FIG. 1 on the function code illustrated in FIG. 3, in accordance with an embodiment of the invention;

FIGS. 4b-4d are an illustrative example of a control flow graph of the heavy functions of FIG. 1 following the operation of the function splitting compiler of FIG. 1 on the function code illustrated in FIG. 3, in accordance with an embodiment of the invention.

DETAILED DESCRIPTION

The use of an application binary interface (ABI) to aid in calling a function may create additional cache overhead and processing required for calling the function, such as saving and restoring the non-volatile registers, allocating and deallocating the stack frame, and saving and restoring the link register. In order to reduce the additional overhead from multiple calls, nested functions may be inlined, such that the first called function contains all of the commands from each function called by the first called function. However, this approach leads to large cache requirements for each function called, which may inhibit performance.

Methods of splitting and inlining functions may be created in order to reduce instances where overhead and processing may lead to a decrease in performance, by minimizing the amount of function calls necessary, while reducing the size of the function to be called. This may be performed by breaking the function down into the basic blocks of the function. The basic blocks may be evaluated to determine if they require use of non-volatile register space, and how much space they would require, or to determine if the basic blocks require saving and a link register to be restored when calling the function. Such basic blocks that require non-volatile register space may be defined as heavy blocks, and the subsequent blocks through the exit block may be split from the main function to create sub-functions from the main function. By doing this, function calls may only call the basic blocks that require few or no non-volatile registers, or all the non-heavy blocks. This may speed up performance of the resulting function by reducing non-volatile memory requirements, as well as saving and restoring the link register, for instances where the path through the function does not require such operations to be performed. However, when a path requiring a heavy block is used, the overhead of calling the sub-function that runs the heavy block is minor compared to the requirements of performing the heavy block. Thus the additional overhead required by calling an additional function only represents a fraction of the processing power required, and the impact on performance to do additional calls may only represent a fraction of the total processing and memory requirements.

Embodiments of the present invention will now be described in detail with reference to the accompanying Figures.

Figure 1:
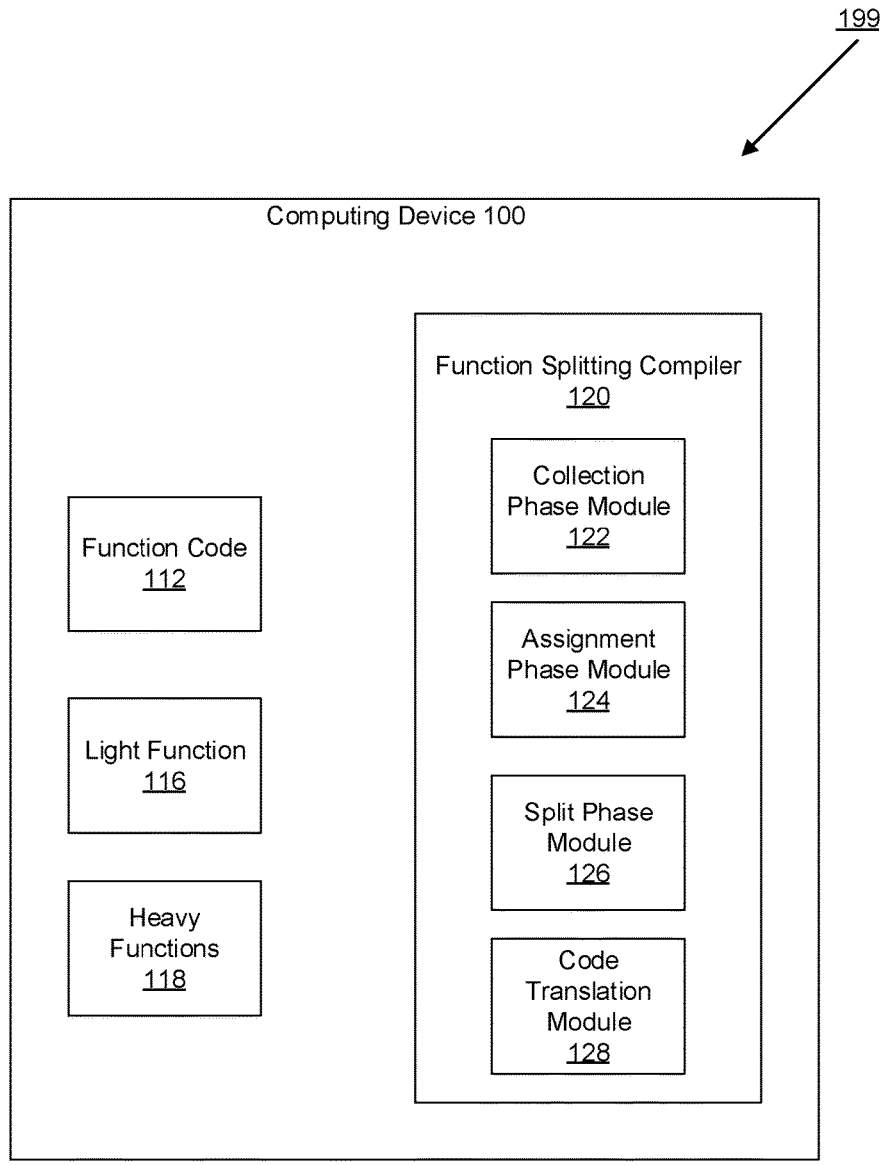
FIG. 1 illustrates a function splitting compiler, in accordance with an embodiment of the invention.

FIG. 1 illustrates a function splitting system 199, in accordance with an embodiment of the invention. In an example embodiment, function splitting system 199 includes a computing device 100.

Computing device 100 includes a computing environment capable of compiling source code into a subsequent programming language, preferably a binary language capable of operating on the hardware of computing device 100. Computing device 100 includes function code 112, light function 116, heavy function(s) 118 and a function splitting compiler 120. In the example embodiment, computing device 100 is a desktop computer, a notebook or a laptop computer; however, in other embodiments, computing device 100 may be a smart phone, a tablet computer, a handheld device, a thin client, or any other electronic device or computing system capable of compiling source code. Computing device 100 is described in more detail with reference to FIG. 3.

Function Code 112 may be source code for a computer function that may be called from an original caller (e.g. a different computer function). The source code may be a high level computing code such as, for example, C, Java, or COBOL. The function code 112 is a collection of code statements formed in a specific order to perform a specific function(s).

Function splitting compiler 120 is a collection of programs that converts the source code contained in function code 112 into target code, which may be a low level code, such as assembly language or machine code, capable of being executed by a processor. Additionally, the function splitting compiler 120 may contain modules that improve the overall performance of the resulting target code. In an exemplary embodiment, the function splitting compiler 120 contains multiple modules that optimize the performance of the function when it is called, by limiting the call overhead required each time the function is called, while concurrently limiting unnecessary function calls within the program. Function splitting compiler 120 may contain collection phase module 122, assignment phase module 124, split phase module 126 and code translation module 128, that perform the functions required to maximize performance of the function.

Collection Phase Module 122 is a portion of the compiler that begins the process of splitting the function code 112, by creating a control flow graph (CFG) from the function code 112, classifying the basic blocks of the CFG created from the function code 112, and determining if the function splitting compiler 120 would produce any benefit. The collection phase module 122 may first create a CFG from the function code 112, where each of the nodes of the CFG is a basic block, and the CFG contains an entry block and an exit block. The basic blocks are then classified as original heavy blocks and original light blocks. Original heavy blocks are basic blocks that are likely to use non-volatile registers, or require saving and restoring of the link register. Original heavy blocks may be: basic blocks that are part of a strongly connected region; basic blocks that contain complex instructions (e.g. square root); or a basic block that contains a call, where the call has more than 4 instructions. During the collection phase, original light blocks are considered to be any blocks that are not heavy.

Once the original heavy blocks have been classified, the collection phase module 122 determines if the function splitting compiler would create a benefit to the function. The collection phase module 122 determines if the entry and exit nodes are not heavy. If the blocks are heavy then there would be no benefit to the split, and the function splitting compiler 120 would send the function code 112 to the code translation module 128. If the entry and exit nodes are not heavy, the collection phase module determines if there is a branch in the function. The branch may be present when it is determined that there is an instruction that may cause the program to go in more than one direction, such as, for example, with if-statements, loop conditions, switch statements and goto statements. If there is no branch, then there would be no benefit to a split, and the function splitting compiler 120 would send the function code 112 to the code translation module 128. If there is a branch, the collection phase module determines if any path, or route, from the entry basic block to the exit basic block (e.g. the nodes that are traversed in going from the entry block to the exit block) only go through original light blocks (i.e. a light path). If there is at least one light path, the function code 112 is capable of function splitting, and the function splitting compiler proceeds to split the original function into a light function 116, which represents the called function, and at least one heavy function 118, which represent sub functions called by the light function.

Assignment Phase Module 124 determines which basic blocks belong to the resulting light function 116 and the heavy function(s) 118, by further classifying each block as a determined heavy block, a determined light block, or as both a determined heavy block and a determined light block. The determined heavy block, determined light block and both designations are further classified based on the basic blocks preceding, and following, each block. The determined light blocks are all of the blocks that exist in a light path, and will be contained in light function 116. The light path may be a route from the entrance node to the exit node that only contain passes through original light blocks.

Each of the blocks that were determined to be original heavy blocks in collection phase module 122 is classified as a determined heavy block. Determined heavy blocks may be determined by first creating a dominator tree for each original heavy block. The dominator tree for each original heavy block contains each basic block that dominates the original heavy block, where the entry block is the root of the tree. Thus, the dominator tree may contain original light blocks that exist in a light path (e.g. determined light blocks). The assignment phase module 124 would classify each basic block of the dominator tree as a determined heavy block as long as the basic block was not contained in a light path. The first determined heavy block of each dominator tree may be referred to as a called determined heavy block, and may represent the entry block for each of subsequently created heavy functions 118, described below.

Additionally, all basic blocks from the original heavy block through the exit block would be classified as determined heavy blocks. Thus, some blocks may be classified as both determined heavy blocks and determined light blocks such as, for example, the exit block. This may occur because such blocks exist in a light path, as well as exist in the path between an original heavy block and the exit block.

Split Phase Module 126 places the determined light blocks, the determined heavy blocks, and basic blocks classified as both determined heavy and determined light, into corresponding functions. This creates a light function 116 and at least one heavy function 118. The heavy functions are functions that start from the called determined heavy block of each heavy function 118 and traverse through the exit block containing determined heavy blocks of the associated branch. The light function 116 contains all of the determined light blocks, as well as the associated calls to each heavy function 118. The exit block of each heavy function 118 contains a tail-call, which returns the heavy function 118 back to the original caller of the light function 116, and not to the light function 116 that called it, in order to reduce any overhead associated with 2 consecutive function calls.

Following the function split, a light function 116 contains the entry block of the function code 112, and all of the determined light blocks and blocks that are classified as both determined light blocks and determined heavy blocks. The determined light blocks form at least one path from the entry block of the function to the exit block of the function. Additionally, where determined heavy blocks existed in the function code of 112, the light function 116 contains a function call to each heavy function 118 that was produced.

Each heavy function 118 contains at least one original heavy block, and contains at least the path from the original heavy block through the exit node. Additionally, the heavy function 118 may contain nodes from the split off of the light function 116 that dominate the original heavy blocks. The heavy function 118 contains a tail-call for the exit node, which returns to the original caller, and not to the light function 116 that called the heavy function 118. This may reduce wasted memory allocation and processing required to return to 2 functions, instead of just 1.

Code translation module 128 converts the source code contained in function code 112, or light function 116 and heavy function(s) 118, and converts the source language into a target language. The target language may be a low level code capable of performing computing operations using processor 304 and memory 306, described in more detail below. The resulting programs created from function code 112, or light function 116 and heavy function(s) 118, may be executable code.

Figure 2:
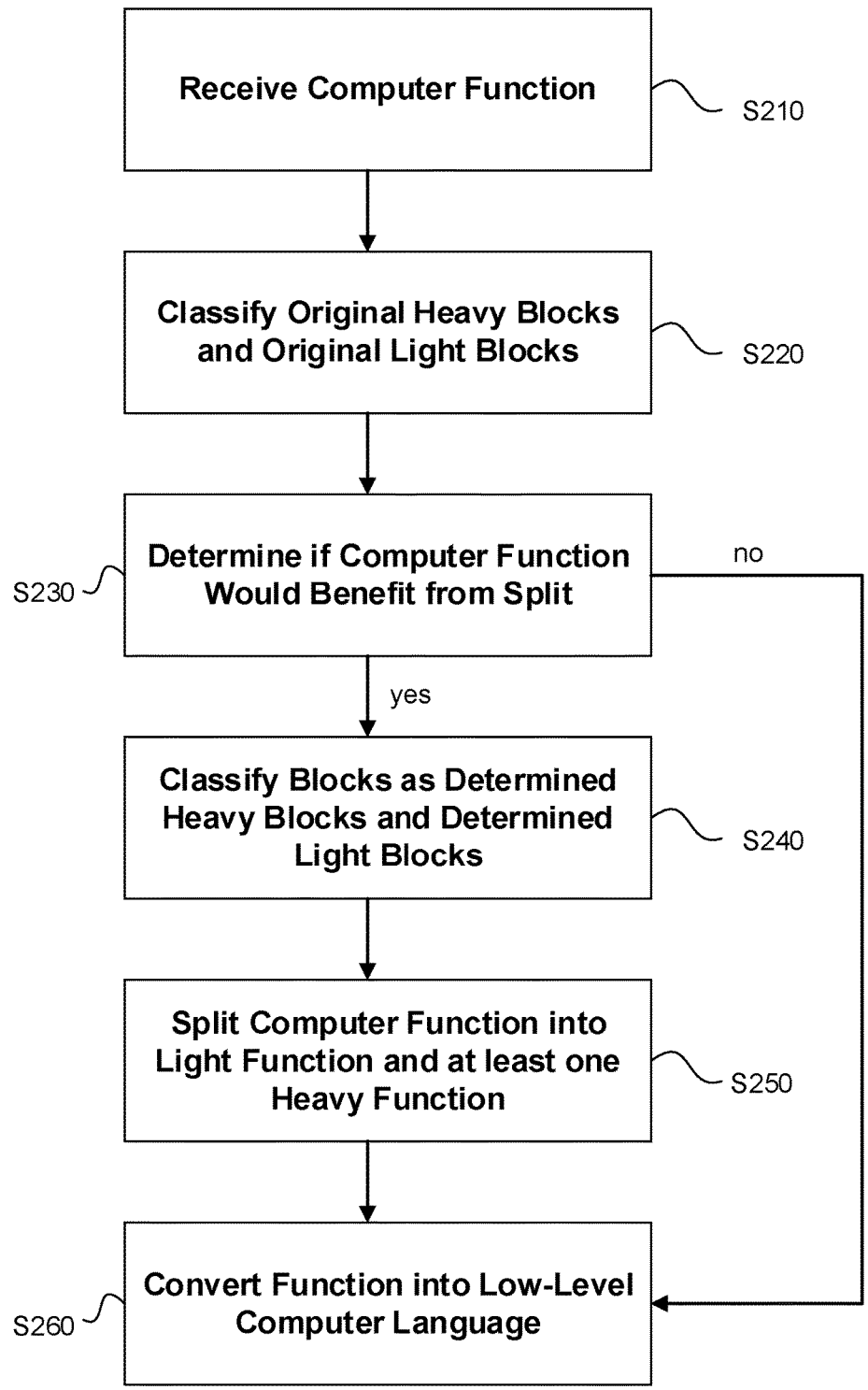
FIG. 2 is a flowchart illustrating the operations of the function splitting compiler of FIG. 1, in accordance with an embodiment of the invention.

FIG. 2 is a flow chart illustrating a method of the function splitting compiler 120. Referring to step s210, the function splitting compiler 120 receives the function code 112 and creates a CFG from the computer function. The function code 112 may contain high level computer code, and is a function called from another segment of code. The CFG may be a representation of the commands to be performed by the function, where each of the commands is represented by a basic block.

Referring to step s220, the function splitting compiler 120 classifies the basic blocks as either original heavy blocks or original light basic blocks. Original heavy blocks are any commands that would require the usage of non-volatile registers when calling the function code 112. Original light basic blocks would not require the use of non-volatile registers.

Referring to step s230, the function splitting compiler 120 determines if the function code 112 would benefit from a split. This is done by looking for a path, referred to as a light path, from the entrance block of the CFG to the exit block of the CFG that contains only original light basic blocks. If such a light path is determined, the compiler continues with step s240. If a light path does not exist, the function splitting compiler 120 proceeds with translating the high level code to low level code in step s260.

Referring to step s240, the function splitting compiler 120 further classifies the light blocks as determined heavy blocks, determined light blocks or both. The function splitting compiler 120 classifies each block in a light path as determined light. Additionally, the function splitting compiler 120 first classifies all basic blocks from an original heavy block, through the exit block, as determined heavy. Further, the function splitting compiler 120 creates a dominator tree of the original heavy blocks. The dominator tree includes each of the basic blocks that dominates the original heavy block. Each basic block in the dominator tree that is not classified as a determined light block is classified as a determined heavy block.

Referring to step s250, the complier 120 splits the function code 112 into a light function 116 and at least one heavy function 118. The light function 116 contains all of the determined light blocks that were classified during step s240. Additionally, light function 116 contains function calls to heavy functions that were originally contained in the function code 112. Each heavy function 118 contains a path starting at determined heavy blocks through to the exit block. Each heavy function 118 contains at least one original heavy block. Additionally, the light function 116 and each heavy function 118 contain a tail call at the exit block, which returns the function to the caller of the original function code 112.

Referring to step s260, the function splitting compiler 120 translates the high level code into low level code capable of being performed on computer processor 304, described in more detail below.

Figure 3:
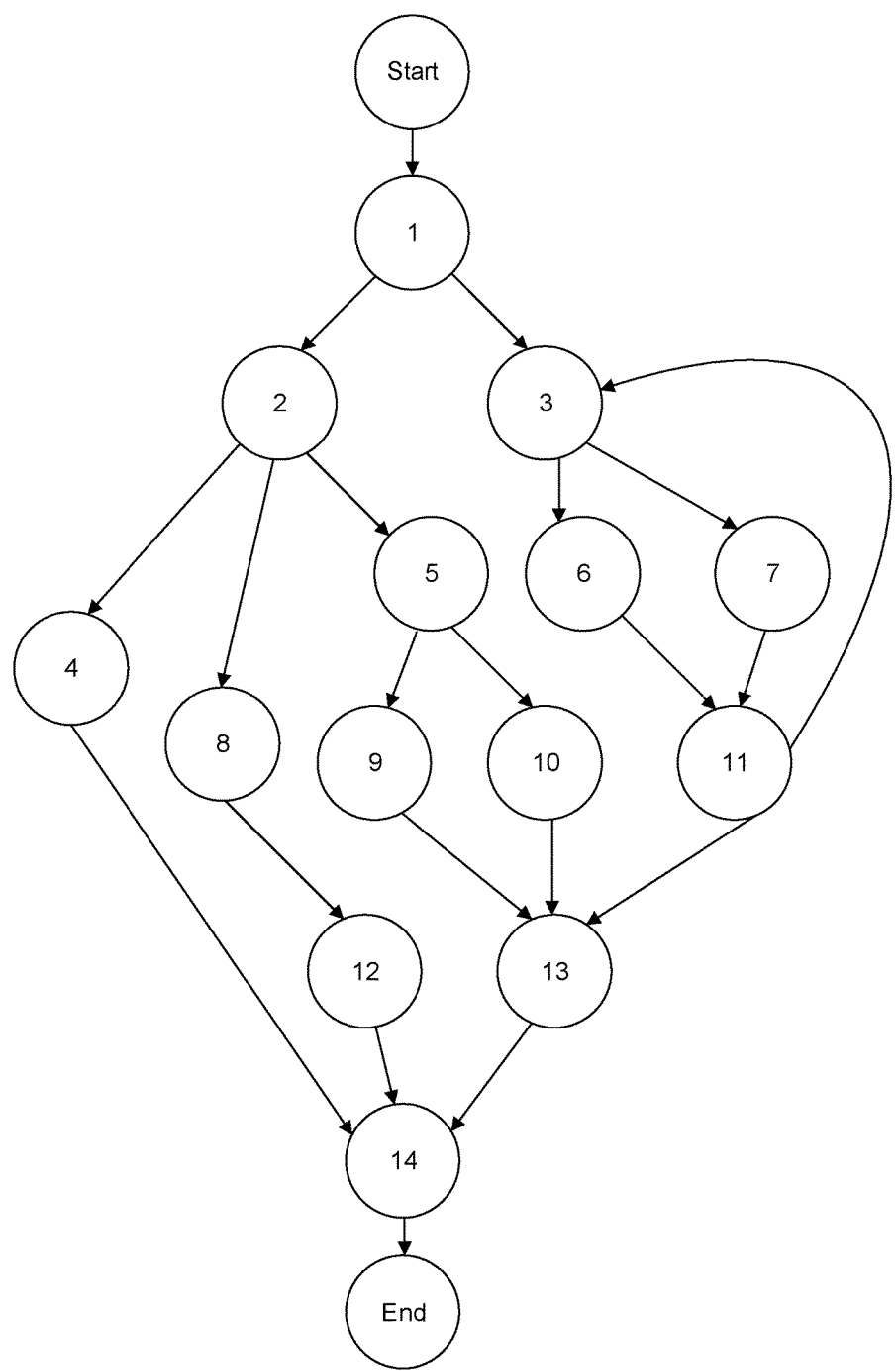
FIG. 3 is an illustrative example of a control flow graph of the function code of FIG. 1, in accordance with an embodiment of the invention.

FIG. 3 is an example control flow graph (CFG), representing function code 112. The CFG shows connections, branches, and loops that were created using blocks 1 through 14, comprising an entry block 1, an exit block 14 and one or more basic blocks 2-13 located between the entry block 1 and the exit block 14. In this example CFG, basic blocks 9 and 12 may contain commands that would use non-volatile registers. During the operation of function splitting compiler 120 on the function code 112, basic blocks 9 and 12 would be classified as original heavy blocks, because they would require non-volatile registers. Further, basic blocks 3, 6, 7 and 11 constitute a strongly connected region, and would thus be classified as original heavy blocks. Blocks 1, 2, 4, 5, 8, 10, 13 and 14 would be classified as original light blocks. The function splitting compiler 120 would then determine if the function code 112 would benefit from splitting the function. In this instance, there are 2 light paths through function code 112 (i.e. 1-2-4-14 and 1-2-5-10-13-14), and thus the function would benefit from a split. The function splitting compiler 120 then classifies the blocks as determined heavy blocks, determined light blocks, or both. The function splitting compiler 120 classifies the blocks in each light path as determined light blocks, so blocks 1, 2, 4, 5, 10, 13 and 14 would be classified as determined light blocks. The function splitting compiler 120 additionally classifies each block from an original heavy block through to the exit block as a determined heavy block, classifying blocks 13 and 14 determined heavy blocks. Thus basic blocks 13 and 14 would be classified as determined heavy and determined light. Further, the function splitting compiler 120 determines the blocks that dominate the original heavy blocks but are not part of a light path, thus classifying basic block 8 as a determined heavy block.

Figures 4A, 4B:
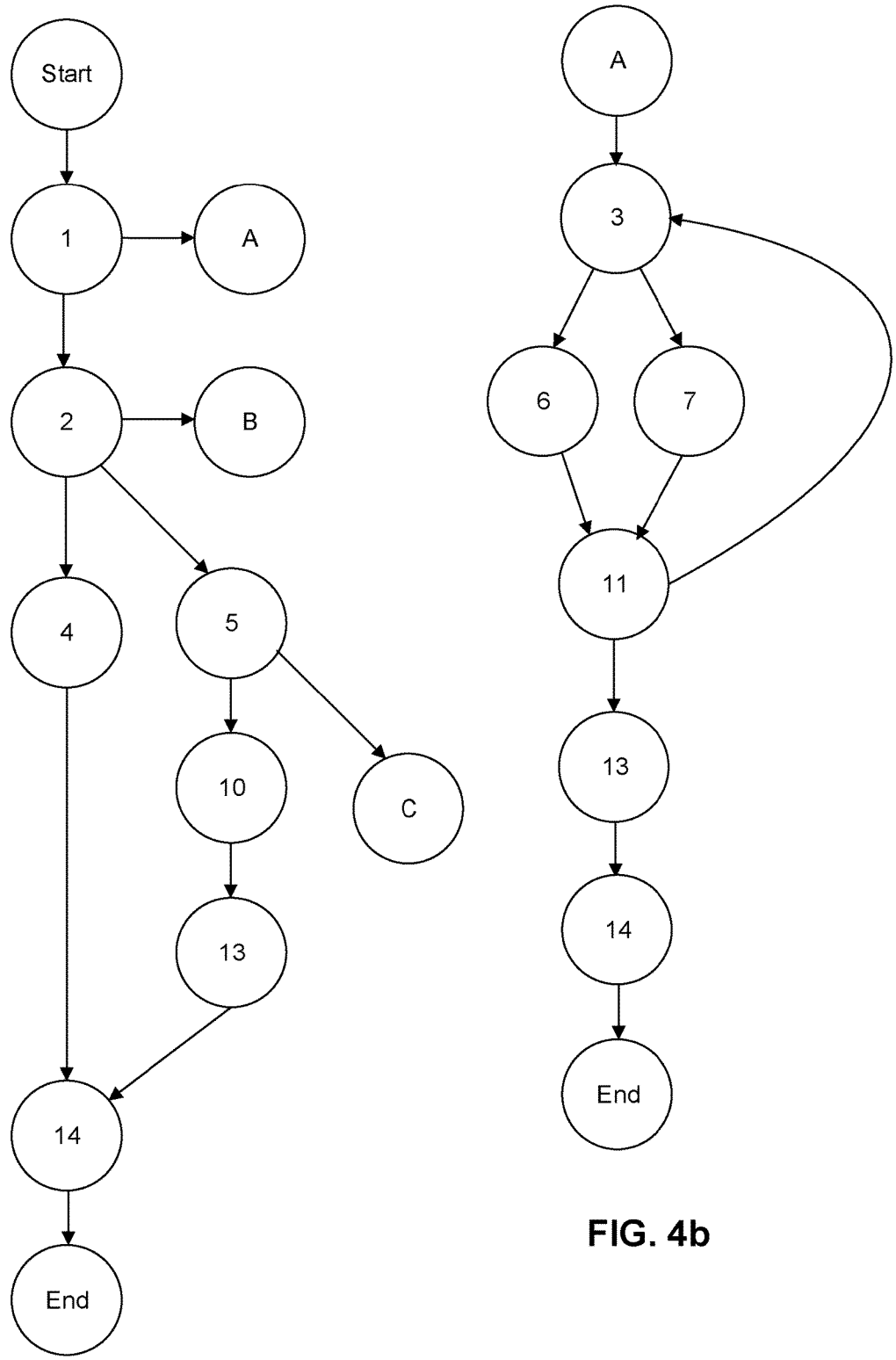

The compiler then splits the function code 112, depicted in FIG. 3, into a light function 116, depicted in FIG. 4a, and 3 separate heavy functions 118, depicted in FIGS. 4b-4d. The light function 116 contains the 2 light paths (i.e. 1-2-4-14 and 1-2-5-10-13-14), as well as function calls to each heavy function that is split, with A, B and C representing the calls to the heavy functions starting with basic blocks 3, 9 and 8, respectively. The heavy functions 118 depicted in FIGS. 4b-4d all contain the exit block 14, and contain a tail call that returns each heavy function to where the function code 112 was originally called.

Figure 5:
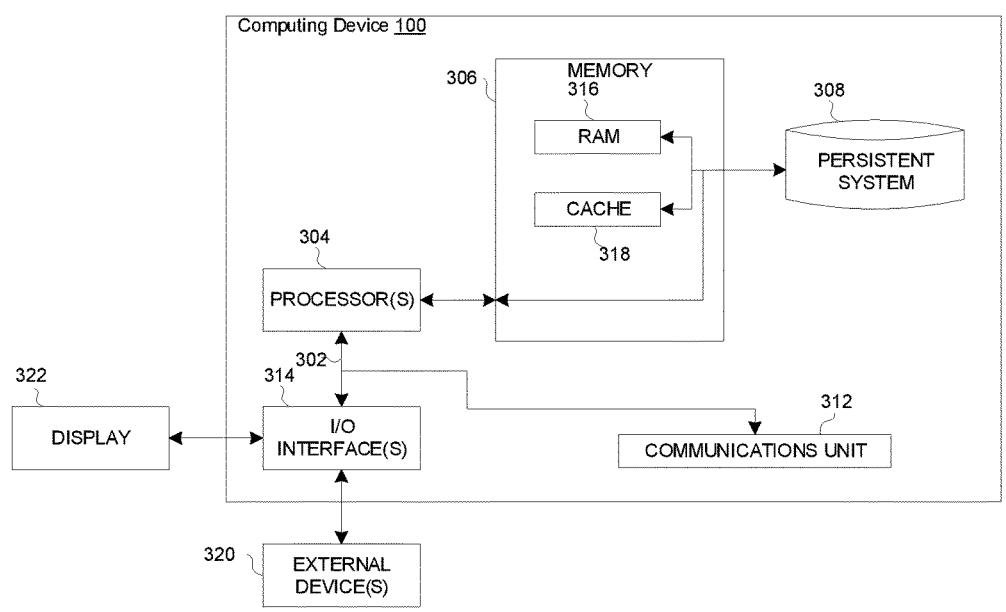
FIG. 5 is a block diagram depicting the hardware components of the computing device of FIG. 1, in accordance with an embodiment of the invention.

FIG. 5 depicts a block diagram of components of computing device 100, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 100 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The function code 112, light function 116, heavy function(s) 118 and function splitting compiler 120, containing collection phase module 122, assignment phase module 124, split phase module 126 and code translation module 128, in computing device 100 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The function code 112, light function 116, heavy function(s) 118 and function splitting compiler 120, containing collection phase module 122, assignment phase module 124, split phase module 126 and code translation module 128, in computing device 100 may be downloaded to persistent storage 308 through communications unit 312.

I/O interface(s) 314 allows for input and output of data with other devices that may be connected to computing device 100. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., the function code 112, light function 116, heavy function(s) 118 and function splitting compiler 120, containing collection phase module 122, assignment phase module 124, split phase module 126 and code translation module 128, in computing device 100, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for splitting a computer function, the method comprising:
creating a control flow graph from a computer function, wherein the control flow graph comprises an entry block, an exit block, and one or more basic blocks located between the entry block and the exit block, and wherein the entry block, the exit block, and one or more basic blocks each represent one or more commands;
classifying each of the one or more basic blocks as one of an original heavy basic block and an original light basic block, wherein the original heavy basic block comprises one or more commands that require saving and restoring non-volatile registers, and wherein the original light basic block does not comprise any command that requires saving and restoring non-volatile registers;

determining that there is a light path through the computer function, wherein a light path comprises a route through the control flow graph of the computer function which consists of one or more original light basic blocks between the entry block and the exit block; and creating a light computer function and one or more heavy computer function from the computer function, wherein each light computer function contains the light path, and one or more calls to one or more heavy computer functions, and wherein each heavy function comprises the one or more blocks between a call of the heavy function and the exit block; and executing the light function, wherein execution of the light function reduces function call overhead compared to the computer function.

2. The method of claim 1, further comprising classifying each of the basic blocks in the light path as a determined light block.

3. The method of claim 2, further comprising classifying one or more basic blocks as determined heavy, wherein classifying one or more basic blocks as determined heavy comprises:
creating a dominator tree of the original heavy blocks;
classifying each block in the dominator tree that was not classified as determined light as determined heavy.

4. The method of claim 1, wherein each heavy computer function contains a tail call that returns to a caller of the computer function.

5. The method of claim 1, further comprising convert the light computer function and the at least one heavy computer function from a high level computer code to a lower level computer code.

6. The method of claim 1, wherein a basic block classified as an original heavy basic block comprises one or more of: a command that requires non-volatile register space, a command that requires saving and restoring a register and a block in a strongly connected region, and wherein a basic block classified as an original light basic block comprises a command that does not require non-volatile register space, a command that does not require saving and restoring a register and a block that is not in a strongly connected region.

7. A computer program product for splitting a computer function, the computer program product comprising:
one or more computer-readable storage medium and program instructions stored on at least one of the one or more storage medium, the program instructions comprising:
program instructions to create a control flow graph from a computer function, wherein the control flow graph comprises an entry block, an exit block, and one or more basic blocks located between the entry block and the exit block, and wherein the entry block, the exit block, and one or more basic blocks each represent one or more commands;
program instructions to classify each of the one or more basic blocks as one of an original heavy basic block and an original light basic block, wherein the original heavy basic block comprises one or more commands that require saving and restoring non-volatile registers, and wherein the original light basic bock does not comprise any command that requires saving and restoring non-volatile registers;

program instructions to determine that there is a light path through the computer function, wherein a light path comprises a route through the control flow graph of the computer function which consists of one or more original light basic blocks between the entry block and the exit block; and program instructions to create a light computer function and one or more heavy computer function from the computer function, wherein each light computer function contains the light path, and one or more calls to one or more heavy computer functions, and wherein each heavy function comprises the one or more blocks between a call of the heavy function and the exit block; and program instructions to execute the light function, wherein execution of the light function reduces function call overhead compared to the computer function.

8. The computer program product of claim 7, further comprising program instructions to classify each of the basic blocks in the light path as a determined light block.

9. The computer program product of claim 8, further comprising program instructions to classify one or more basic blocks as determined heavy, wherein classifying one or more basic blocks as determined heavy comprises:
program instructions to create a dominator tree of the original heavy blocks;
program instructions to classify each block in the dominator tree that was not classified as determined light as determined heavy.

10. The computer program product of claim 7, wherein each heavy computer function contains a tail call that returns to a caller of the computer function.

11. The computer program product of claim 7, further comprising program instructions to convert the light computer function and the at least one heavy computer function from a high level computer code to a lower level computer code.

12. The computer program product of claim 7, wherein a basic block classified as an original heavy basic block comprises one or more of: a command that requires non-volatile register space, a command that requires saving and restoring a register and a block in a strongly connected region, and wherein a basic block classified as an original light basic block comprises a command that does not require non-volatile register space, a command that does not require saving and restoring a register and a block that is not in a strongly connected region.

13. A computer system for splitting a computer function, the computer system comprising:
one or more processors, one or more computer-readable memories, one or more computer-readable storage medium, and program instructions stored on at least one of the one or more storage medium for execution by at least one of the one or more processors via at least one of the one or more memories, the program instructions comprising:
program instructions to create a control flow graph from a computer function, wherein the control flow graph comprises an entry block, an exit block, and one or more basic blocks located between the entry block and the exit block, and wherein the entry block, the exit block, and one or more basic blocks each represent one or more commands;
program instructions to classify each of the one or more basic blocks as one of an original heavy basic block and an original light basic block, wherein the original heavy basic block comprises one or more commands that require saving and restoring non-volatile registers, and wherein the original light basic block does not comprise any command that requires saving and restoring non-volatile registers;

program instructions to determine that there is a light path through the computer function, wherein a light path comprises a route through the control flow graph of the computer function which consists of one or more original light basic blocks between the entry block and the exit block; and program instructions to create a light computer function and one or more heavy computer function from the computer function, wherein each light computer function contains the light path, and one or more calls to one or more heavy computer functions, and wherein each heavy function comprises the one or more blocks between a call of the heavy function and the exit block; and program instructions to execute the light function, wherein execution of the light function reduces function call overhead compared to the computer function.

14. The computer system of claim 13, further comprising program instructions to classify each of the basic blocks in the light path as a determined light block.

15. The computer system of claim 14, further comprising program instructions to classify one or more basic blocks as determined heavy, wherein classifying one or more basic blocks as determined heavy comprises:

program instructions to create a dominator tree of the original heavy blocks;

program instructions to classify each block in the dominator tree that was not classified as determined light as determined heavy.

16. The computer system of claim 13, wherein each heavy computer function contains a tail call that returns to a caller of the computer function.

17. The computer system of claim 13, wherein a basic block classified as an original heavy basic block comprises one or more of: a command that requires non-volatile register space, a command that requires saving and restoring a register and a block in a strongly connected region, and wherein a basic block classified as an original light basic block comprises a command that does not require non-volatile register space, a command that does not require saving and restoring a register and a block that is not in a strongly connected region.

* * * * *